(12) United States Patent
Chan et al.

(10) Patent No.: US 10,705,577 B2
(45) Date of Patent: Jul. 7, 2020

(54) ELECTRONIC DEVICE AND COVER ADAPTED TO ELECTRONIC DEVICE

(71) Applicant: ASUSTEK COMPUTER INC., Taipei (TW)

(72) Inventors: Wai-Tong Chan, Taipei (TW); Sin-Fei Lai, Taipei (TW); Szu-Tang Chiu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/031,348

(22) Filed: Jul. 10, 2018

(65) Prior Publication Data

US 2019/0018462 A1    Jan. 17, 2019

Related U.S. Application Data

(60) Provisional application No. 62/530,855, filed on Jul. 11, 2017.

(30) Foreign Application Priority Data

May 25, 2018    (CN) .......................... 2018 1 0516122

(51) Int. Cl.
*G06F 1/18*        (2006.01)
*G06F 1/16*        (2006.01)

(52) U.S. Cl.
CPC .............. *G06F 1/182* (2013.01); *G06F 1/166* (2013.01); *G06F 1/1656* (2013.01); *G06F 2200/1634* (2013.01)

(58) Field of Classification Search
CPC ................................. G06F 1/182; G06F 1/166
See application file for complete search history.

(56) References Cited

U.S. PATENT DOCUMENTS

| 8,253,518 | B2 * | 8/2012 | Lauder | G06F 1/1647 |
| | | | | 206/320 |
| 8,312,991 | B2 * | 11/2012 | Diebel | G06F 1/1626 |
| | | | | 206/45.24 |
| 8,344,836 | B2 * | 1/2013 | Lauder | H01F 7/04 |
| | | | | 335/219 |

(Continued)

FOREIGN PATENT DOCUMENTS

CN        203733183 U        7/2014
CN        204360296 U        5/2015

(Continued)

OTHER PUBLICATIONS

Taiwanese Office Action based on corresponding TW Application No. 107117850, dated Sep. 25, 2019.

(Continued)

*Primary Examiner* — Hoa C Nguyen
*Assistant Examiner* — Keith DePew
(74) *Attorney, Agent, or Firm* — Muncy, Geissler, Olds & Lowe, P.C.

(57) ABSTRACT

The disclosure provides a cover, adapted to an electronic device. The electronic device includes a housing, and the housing includes an opening. The cover includes a plurality of creases. The cover forms a folding structure by folding along the creases, and the cover is detachably fixed to the housing to cover the opening.

11 Claims, 15 Drawing Sheets

(56) References Cited

U.S. PATENT DOCUMENTS

| | | | | |
|---|---|---|---|---|
| 8,960,421 | B1* | 2/2015 | Diebel | G06F 1/1679 206/45.2 |
| 9,075,566 | B2* | 7/2015 | Whitt, III | G06F 1/16 |
| 9,310,835 | B2* | 4/2016 | Bryan | A45C 13/1069 |
| 9,419,669 | B2* | 8/2016 | Smith | A45C 5/02 |
| 9,419,670 | B2* | 8/2016 | Fathollahi | H04B 1/3888 |
| 9,485,338 | B2* | 11/2016 | Balaji | H04M 1/04 |
| 9,645,721 | B2* | 5/2017 | Horne | G06F 3/04847 |
| 9,715,254 | B2* | 7/2017 | Mori | G06F 1/1628 |
| 9,729,685 | B2* | 8/2017 | Ive | G06F 1/1677 |
| 9,905,964 | B2* | 2/2018 | Degner | H01R 13/6205 |
| 9,946,312 | B2* | 4/2018 | McCracken | G06F 1/182 |
| 9,979,427 | B2* | 5/2018 | Thomas | H05K 9/0069 |
| 10,063,269 | B2* | 8/2018 | Smith | B32B 37/1284 |
| 10,110,268 | B2* | 10/2018 | Smith | A45C 5/02 |
| 10,231,043 | B2* | 3/2019 | Hemesath | H04R 1/026 |
| 2010/0300909 | A1* | 12/2010 | Hung | H04M 1/04 206/320 |
| 2011/0297564 | A1* | 12/2011 | Kim | A45C 11/00 206/320 |
| 2012/0268891 | A1* | 10/2012 | Cencioni | G06F 1/1626 361/679.55 |
| 2012/0300383 | A1* | 11/2012 | Lauder | G06F 1/1647 361/679.26 |
| 2012/0308981 | A1* | 12/2012 | Libin | G09B 3/00 434/362 |
| 2013/0048517 | A1* | 2/2013 | Mecchella | A45C 11/00 206/216 |
| 2013/0076614 | A1* | 3/2013 | Ive | G06F 1/1677 345/156 |
| 2013/0233762 | A1* | 9/2013 | Balaji | B65D 25/00 206/736 |
| 2014/0246340 | A1* | 9/2014 | Jiang | A45C 11/00 206/45.23 |
| 2015/0065208 | A1* | 3/2015 | Balaji | H04M 1/04 455/575.8 |
| 2015/0076186 | A1* | 3/2015 | Wong | G06F 1/1628 224/191 |
| 2016/0259514 | A1 | 9/2016 | Sang et al. | |
| 2016/0323002 | A1 | 11/2016 | Cho et al. | |
| 2018/0164938 | A1* | 6/2018 | Li | H03K 17/97 |

FOREIGN PATENT DOCUMENTS

| | | |
|---|---|---|
| CN | 105549705 A | 5/2016 |
| CN | 105639811 A | 6/2016 |
| CN | 105889721 A | 8/2016 |
| CN | 105892973 A | 8/2016 |
| CN | 205864959 U | 1/2017 |
| TW | 200901906 A | 1/2009 |
| TW | M47947 U | 3/2014 |
| TW | M474947 U | 3/2014 |
| TW | M491451 U | 12/2014 |
| TW | M508947 U | 9/2015 |

OTHER PUBLICATIONS

Chinese Office Action which corresponds to Application No. 201810516122.4; dated Dec. 25, 2019.

* cited by examiner

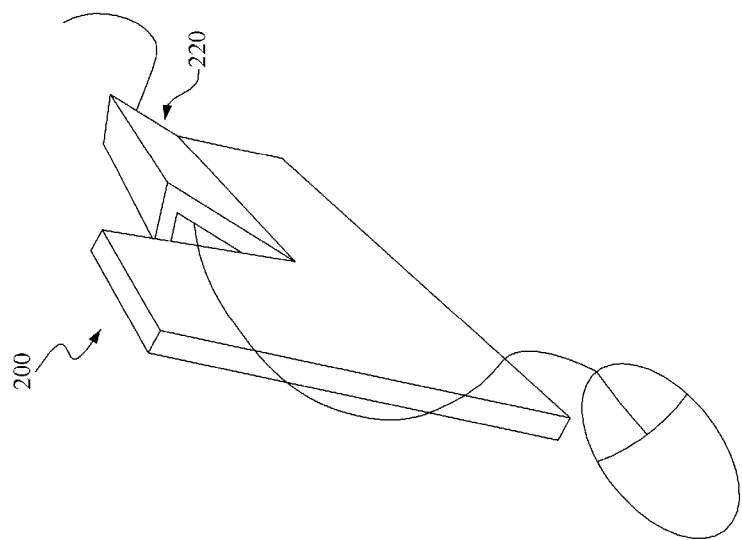

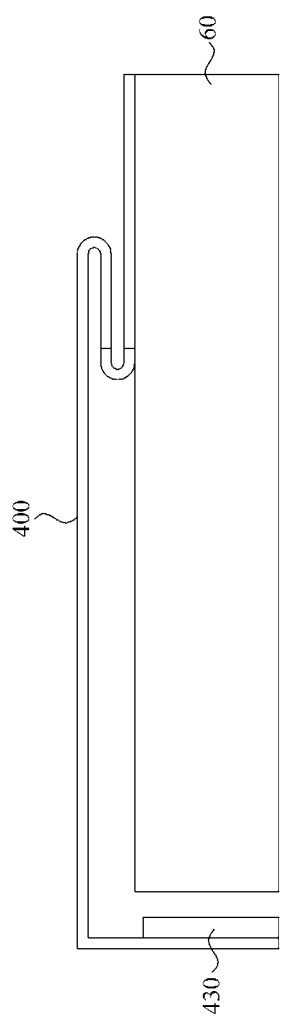

ELECTRONIC DEVICE AND COVER ADAPTED TO ELECTRONIC DEVICE

CROSS-REFERENCE TO RELATED APPLICATION

This application claims the priority benefit of U.S. Provisional Patent Application No. 62/530,855, filed on Jul. 11, 2017, and CN Patent Application No. 201810516122.4 filed on May 25, 2018. The entirety of the above-mentioned patent application is hereby incorporated by reference herein and made a part of specification.

BACKGROUND OF THE INVENTION

Field of the Invention

The disclosure relates to an electronic device, and in particular, to a cover adapted to an electronic device.

Description of the Related Art

In consideration of electromagnetic shielding and security, to design heat dissipation holes and select the material of an electronic device housing become significantly limited. For example, a metal housing of the electronic device is not suitable to form an excessively large opening on the housing. Therefore, appearance design of the electronic device is also limited.

BRIEF SUMMARY OF THE INVENTION

The disclosure provides an electronic device and a cover adapted to an electronic device. In addition to an electromagnetic shielding effect, the shape of the cover adapted to an electronic device is varied according to a requirement of a user to provide diversified usage modes.

An embodiment of the disclosure provides a cover, adapted to an electronic device. The electronic device includes a housing, and the housing includes at least one opening. The cover includes a plurality of creases. The cover forms a folding structure by folding along the creases, and the cover is detachably fixed to the housing to cover the opening.

The disclosure further provides an electronic device. The electronic device includes a housing and a cover. The housing includes at least one opening. The cover includes a plurality of creases. The cover forms a folding structure by folding along the creases, and the cover is detachably fixed to the housing to cover the opening.

The cover in the disclosure further provides diversified usage modes besides conventional electromagnetic shielding effects. The cover includes creases configured to form a folding structure according to a requirement of a user. The folding structure provides diversified usage modes, for example, adjusting a size of a heat dissipation channel, adjusting an inclination angle of an electronic device, and forming a support frame for placing an object. The usage experience is thus improved.

Specific embodiments used in the disclosure are further described by using the following embodiments and figures.

BRIEF DESCRIPTION OF THE DRAWINGS

FIG. 4B is a schematic diagram of a second embodiment of a usage aspect of a folding structure formed by the cover in FIG. 3;

FIG. 7A to FIG. 7D are schematic diagrams of a fourth embodiment of a cover according to the disclosure.

DETAILED DESCRIPTION OF THE EMBODIMENTS

Specific implementations of the disclosure are described below in further detail with reference to schematic diagrams. According to the following descriptions and claims, advantages and features of the disclosure are clearer. It should be noted that each figure uses an extremely simplified form and an imprecise proportion, and is merely intended for assistance in conveniently and explicitly explaining objectives of embodiments of the disclosure.

Figure 1:
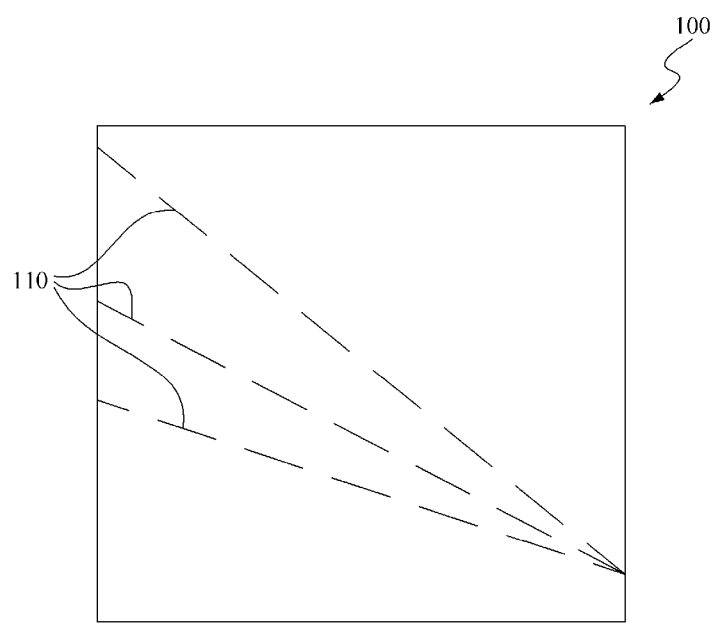
FIG. 1 is a schematic diagram of a first embodiment of a cover adapted to an electronic device according to the disclosure.
Figure 2A:
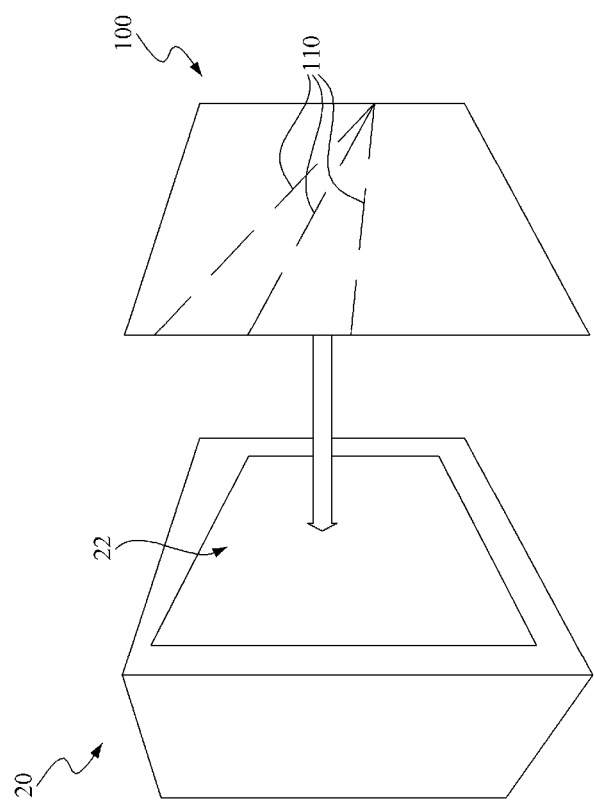
FIG. 2A is a schematic diagram showing that the cover in FIG. 1 is detachably fixed to an electronic device.
Figure 2B:
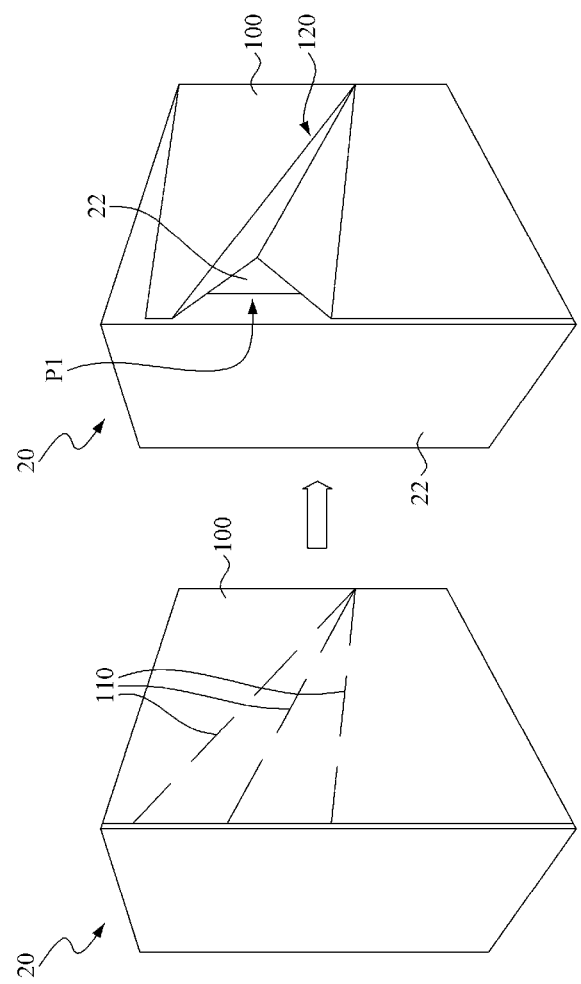
FIG. 2B is a schematic diagram showing that the cover in FIG. 1 folds to form a folding structure.

FIG. 1 a schematic diagram of a first embodiment of a cover 100 adapted to an electronic device according to the disclosure. FIG. 2A is a schematic diagram showing that the cover 100 in FIG. 1 is detachably fixed to an electronic device 20. FIG. 2B is a schematic diagram showing that the cover 100 in FIG. 1 folds to form a folding structure. The electronic device 20 includes an opening 22. The cover 100 is detachably fixed to a housing of the electronic device 20. The electronic device 20 is a desktop computer, a notebook computer, a tablet computer, a router, a mainboard, a graphic card, or the like. In an embodiment, the cover 100 is provided with an electromagnetic shielding function.

In this embodiment, as shown in FIG. 2A, the cover 100 is configured to detachably cover the opening 22 of the electronic device 20 to provide electromagnetic shielding protection.

In an embodiment, the opening 22 is a through hole on the housing of the electronic device 20. In an embodiment, the opening 22 is a heat dissipation hole of the electronic device 20. In this way, when the cover 100 is detached, the opening 22 allows air to flow inside the electronic device 20 and take heats outward to improve a heat dissipation effect. This embodiment discloses an undiversified opening 22 as an example. However, the disclosure is not limited thereto. An appearance and a quantity of the opening 22 of the electronic device are adjusted according to an actual requirement. Furthermore, the opening 22 is not limited to a heat dissipation hole.

As shown in FIG. 2B, the cover 100 includes a plurality of creases 110. A user selectively folds along the creases 110 to form a folding structure 120. In this embodiment, the folding structure 120 is a heat dissipation channel P1, and heat inside the electronic device 20 is dissipated outside through the heat dissipation channel P1.

The foldable cover 100 is able to be adjusted into different folding modes based on the position, the shape or other requirements to a heat dissipation hole to form different heat dissipation channels, thereby improving heat dissipation efficiency of the electronic device. In an embodiment, when the electronic device 20 detects that a folding mode of the cover 100 changes, the electronic device 20 adjusts a heat dissipation setting thereof based on the change to provide relatively good efficiency. In an embodiment, the setting is the heat dissipation setting or other performing settings accordingly, which is not limited herein.

In an embodiment, as shown in FIG. 2B, compared with a folding mode in the left of the figure, a folding mode (namely, a mode in which the heat dissipation channel P1 is formed by folding) in the right of the figure provides a relatively good heat dissipation effect. When the electronic device 20 detects that the cover 100 changes from the folding mode in the left of the figure to the folding mode in the right of the figure, the operation mode of the electronic device 20 switches to a high-efficiency mode accordingly, in an embodiment, an overclocking mode. Otherwise, when the electronic device 20 detects that the cover 100 changes from the folding mode in the right of the figure to the folding mode in the left of the figure, the electronic device 20 switches the operation mode into a normal operating mode.

In an embodiment, the cover 100 includes a plurality of fixing elements, configured to detachably fix the cover 100 to the electronic device 20 to cover the opening 22 of the electronic device 20. The fixing elements are fixed to the electronic device 20 by magnetic attraction, attachment or fastening ways. However, the disclosure is not limited thereto.

In an embodiment, the cover 100 includes a plurality of sensing elements, configured to interact with the electronic device 20. In an embodiment, when the sensing elements detect that the cover 100 is in a folded state, the sensing elements send a signal to the electronic device 20 to perform a corresponding function. In an embodiment, when the sensing elements detect that the cover 100 forms the heat dissipation channel P1 in the right of FIG. 2B, the sensing elements send a signal to the electronic device 20, and the electronic device 20 switches to a high-efficiency mode.

Figure 2C:
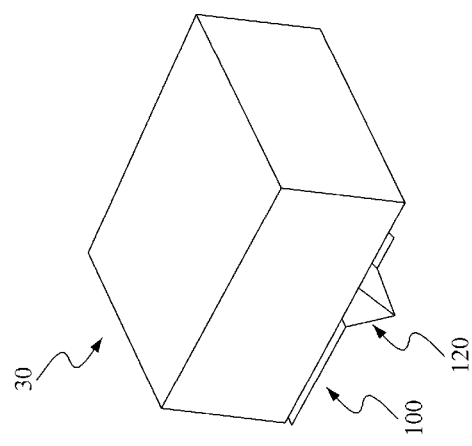
FIG. 2C is a schematic diagram of another usage aspect in which the cover in FIG. 1 forms a folding structure along creases.
Figure 2C:
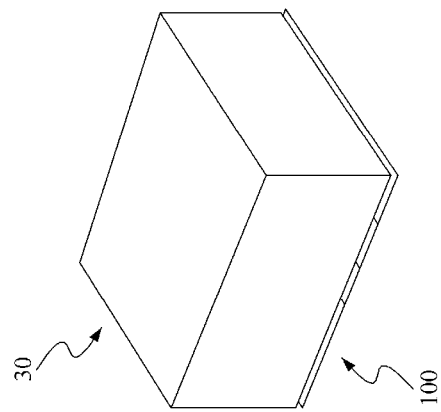

FIG. 2C is a schematic diagram of another usage aspect in which the cover 100 in FIG. 1 forms a folding structure 120 along creases. As shown in the figure, the cover 100 is detachably fixed below an electronic device 30 to serve as a support frame. Through changing a folding mode of the cover, an inclination angle of the electronic device 30 is adjusted to facilitate user's operation. In an embodiment, when the electronic device 30 detects that a folding mode of the cover 100 changes, the electronic device 30 adjust a setting thereof or perform a corresponding program based on the change.

Operation and adjustment performed by the electronic devices 20 and 30 based on the signal from the sensing elements are not limited to the normal operating mode and the high-efficiency mode that mentioned foregoing. In an embodiment, the modes include a multimedia display mode or a game mode based on the signal.

Figure 2D:
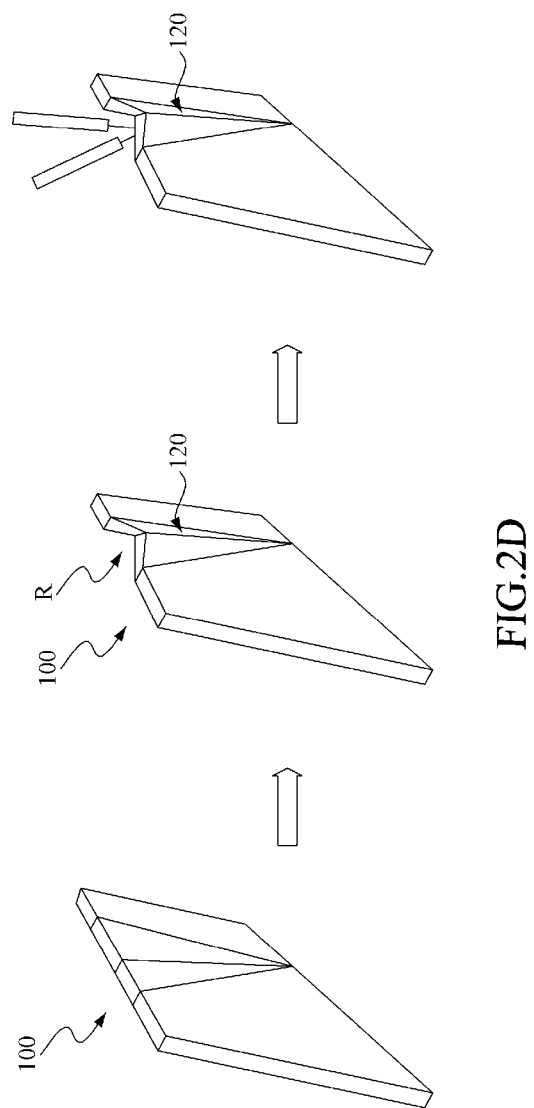
FIG. 2D is a schematic diagram of still another usage aspect in which the cover in FIG. 1 forms a folding structure along creases.

FIG. 2D is a schematic diagram of still another usage aspect in which the cover 100 in FIG. 1 that forms a folding structure 120 along creases. As shown in the figure, the cover 100 is detachably fixed to a side surface of an electronic device, the folding structure 120 formed by the cover 100 is utilized as an accommodating space R for an object such as a screwdriver.

Figure 3:
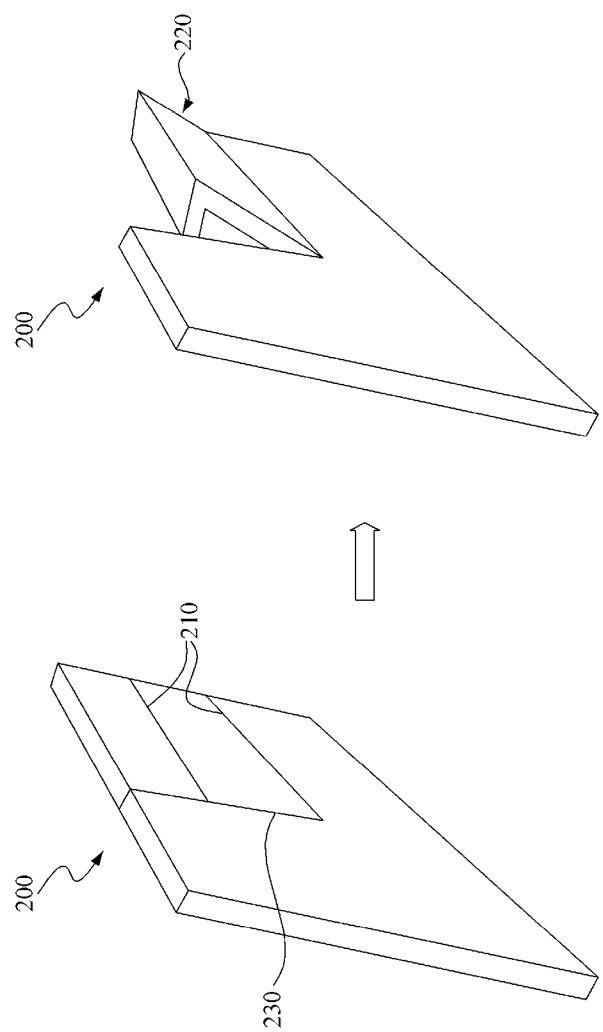
FIG. 3 is a schematic diagram of a second embodiment of a cover according to the disclosure.
Figure 4A:
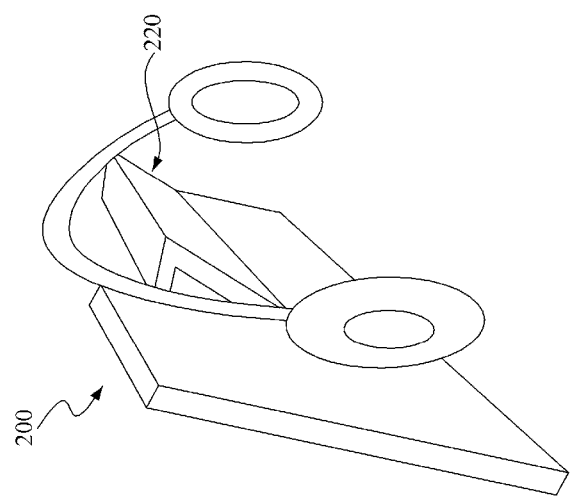
FIG. 4A is a schematic diagram of a first embodiment of a usage aspect of a folding structure formed by the cover in FIG. 3.

FIG. 3 is a second embodiment of a cover 200 according to the disclosure. FIG. 4A is a first usage aspect of a folding structure 220 that formed by the cover 200 in FIG. 3. FIG. 4B is a second usage aspect of a folding structure 220 formed by the cover 200 in FIG. 3. Compared with the embodiment of FIG. 1, in addition to creases 210, the cover 200 further includes a cutting line 230. The folding structure 220 formed by folding the cover 200 forms a bracket for a user to place an object, in an embodiment, a common electronic accessory such as a headset, or forms a holder to hold an electronic accessory such as a connection wire of a mouse or a keyboard.

Figure 5:
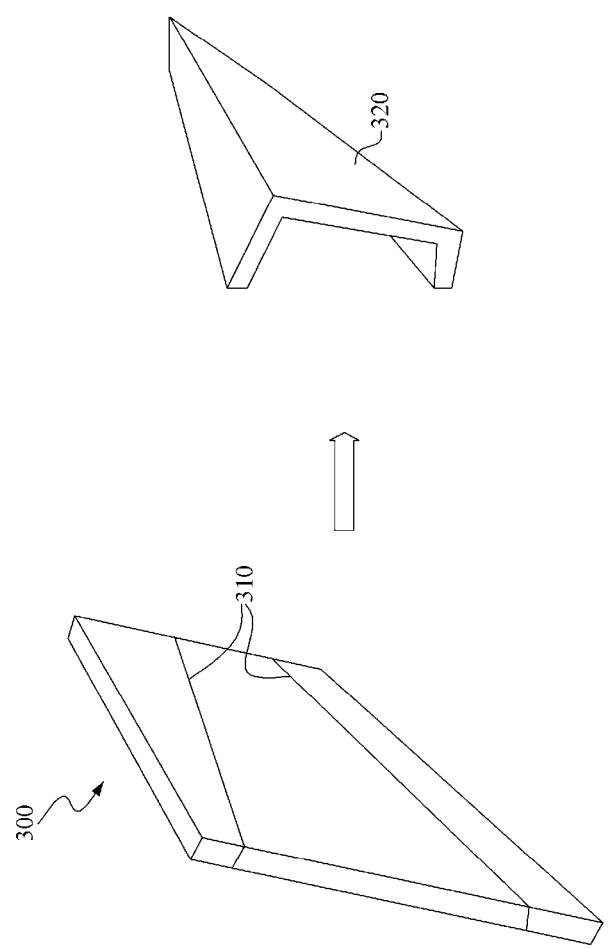
FIG. 5 is a schematic diagram of a third embodiment of a cover according to the disclosure.
Figure 6A:
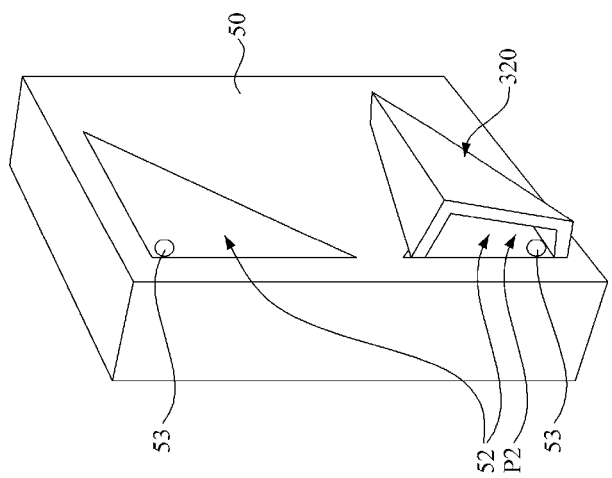
FIG. 6A is a schematic diagram of a first embodiment of a usage aspect in which the cover in FIG. 5 forms a folding structure along creases.

FIG. 5 is a schematic diagram of a third embodiment of a cover 300 according to the disclosure. FIG. 6A is a schematic diagram of a first embodiment of a usage aspect in which the cover 300 in FIG. 5 forms a folding structure 320 along creases 310. Compared with the embodiment of FIG. 1, a shape and a size of the folding structure 320 formed by folding the cover 300 in this embodiment are corresponding to an opening 52 of an electronic device 50, and the folding structure 320 is detachably fixed to the opening 52 to provide an electromagnetic shielding effect, and forms a heat dissipation channel P2 to dissipate heat.

In an embodiment, the cover 300 includes an identification element. The electronic device 50 includes sensing elements 53 for detecting the identification element to determine a change or a position of the cover, to perform a corresponding setting. According to a requirement, a user can detach or assemble the cover 300, or change to the cover 300 with a different function.

In an embodiment, when the electronic device 50 detects that the cover 300 forms the heat dissipation channel P2, the electronic device 50 switches to a high-efficiency mode.

Figure 6B:
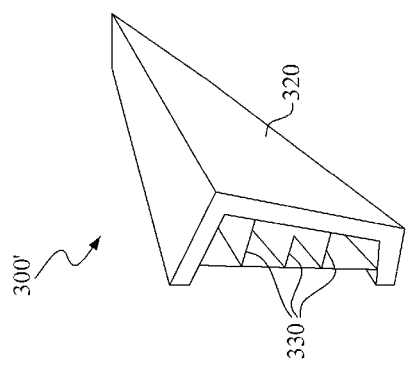
FIG. 6B is a schematic diagram of a second embodiment of a usage aspect in which the cover in FIG. 5 forms a folding structure along creases.

FIG. 6B is a schematic diagram of a second embodiment of a usage aspect in which the cover 300 in FIG. 5 forms a folding structure 320 along creases. Compared with the folding structure 320 in FIG. 6A, for a cover 300' in this embodiment, a plurality of heat dissipation sheets 330 is disposed in the heat dissipation channel formed by the folding structure 320, to improve a heat dissipation effect.

In an embodiment, when the electronic device 50 detects that the cover 300 folds to form an optical channel or an amplifying channel, the electronic device 50 performs a multimedia program.

Figure 7A:
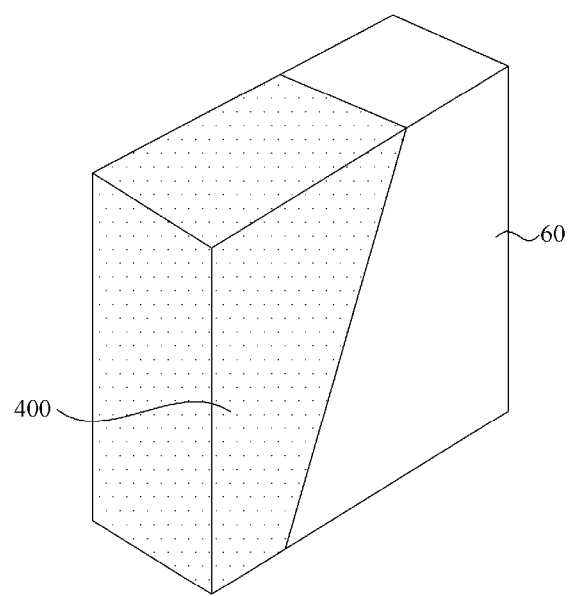
Figure 7C:
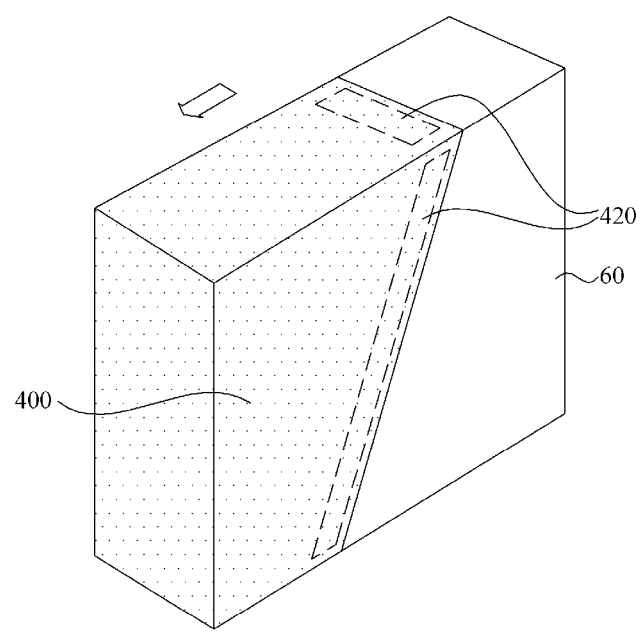
Figure 7D:
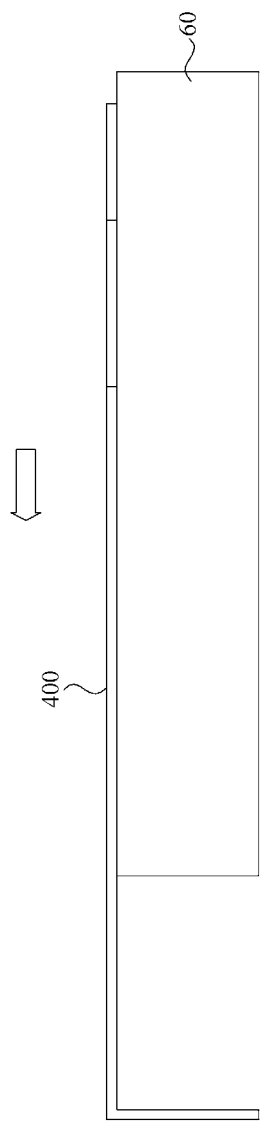

FIG. 7A to FIG. 7D are schematic diagrams of a fourth embodiment of a cover according to the disclosure. FIG. 7B is a schematic top view corresponding to FIG. 7A. FIG. 7D is a schematic top view corresponding to FIG. 7C. As shown in the figure, a cover 400 includes a mesh structure, and is sleeved with an electronic device 60. The cover 400 is connected to the electronic device 60 in various connection modes, to conform to a requirement of a user.

In an embodiment, the cover 400 includes a plurality of sensing elements 430, disposed at different positions. In an embodiment, as shown in FIG. 7A and FIG. 7B, in a normal operating mode, such as word processing or website browsing, the cover 400 is completely connected to the electronic device 60. In an embodiment, as shown in FIG. 7C and FIG.

7D, when the cover 400 moves outward to form an opening 420, the sensing elements 430 are triggered to send a signal to the electronic device 60. After the electronic device 60 receives the signal, the electronic device 60 switches to an overclocking mode. The signal is also used for triggering the electronic device 60 to change a heat dissipation setting or other performing settings, to adjust an operating mode of the electronic device 60.

A housing of a conventional electronic device includes only electromagnetic shielding and heat dissipation functions. In comparison, in addition to an electromagnetic shielding effect, the cover provided in the disclosure further includes creases, so as to form a folding structure according to a requirement of a user. The folding structure provides diversified usage modes, in an embodiment, adjusting a size of a heat dissipation channel, adjusting an inclination angle of an electronic device, and forming a support frame for placing an object. The usage experience is thus improved.

Although the disclosure includes been disclosed above by using the embodiments, they are not intended to limit the disclosure. Any person of ordinary skill in the technical field can vary or modify the disclosure, without departing from the spirit or scope of the disclosure. Therefore, the protection scope of the disclosure is defined by the claims.

What is claimed is:

1. A cover, adapted to an electronic device, wherein the electronic device comprises a housing, and the housing includes an opening, and the cover comprising:
    a plurality of creases, the cover forms a folding structure by folding along the creases, and the cover is detachably fixed to the housing to cover the opening,
    wherein the plurality of creases linearly extend from one side to an opposite side of the cover, and
    wherein at least three of the plurality of creases are non-parallel to each other and do not intersect with each other.

2. The cover according to claim 1, further comprising a sensing element, configured to detect a folded state of the cover, and send a signal to the electronic device.

3. The cover according to claim 1, wherein the cover is detachably fixed to the housing by a magnetic element or a fastening element.

4. The cover according to claim 1, wherein the cover is formed by a material having an electromagnetic shielding effect.

5. The cover according to claim 1, wherein the cover forms the folding structure corresponding to the opening of the housing.

6. The cover according to claim 1, wherein all of the plurality of creases are non-parallel to each other and do not intersect with each other.

7. An electronic device, comprising:
    a housing, having an opening; and
    a cover, comprising a plurality of creases, forming a folding structure by folding along the creases, and detachably fixed to the housing to cover the opening,
    wherein the plurality of creases linearly extend from one side to an opposite side of the cover, and
    wherein at least two three of the plurality of creases are non-parallel to each other and do not intersect with each other.

8. The electronic device according to claim 7, wherein the cover comprises a sensing element, configured to detect a folded state of the cover, and send a signal outward, and the electronic device adjusts an operating mode thereof based on the signal.

9. The electronic device according to claim 7, wherein the cover is detachably fixed to the housing by a magnetic element or a fastening element.

10. The electronic device according to claim 7, wherein the cover forms the folding structure corresponding to the opening of the housing.

11. The electronic device according to claim 7, wherein all of the plurality of creases are non-parallel to each other and do not intersect with each other.

* * * * *